(12) United States Patent
Oh

(10) Patent No.: US 7,137,634 B2
(45) Date of Patent: Nov. 21, 2006

(54) ACTIVE CONTROL TYPE MOUNTING BUSHING DEVICE FOR VEHICLE

(75) Inventor: Young-Min Oh, Busan Metropolitan (KR)

(73) Assignee: Kia Motors Corporation, Seoul (KR)

(*) Notice: Subject to any disclaimer, the term of this patent is extended or adjusted under 35 U.S.C. 154(b) by 415 days.

(21) Appl. No.: 10/750,669

(22) Filed: Dec. 31, 2003

(65) Prior Publication Data

US 2005/0082771 A1 Apr. 21, 2005

(30) Foreign Application Priority Data

Oct. 21, 2003 (KR) .................... 10-2003-0073388

(51) Int. Cl.
*B60G 17/01* (2006.01)
*B60G 17/0165* (2006.01)

(52) U.S. Cl. .................. 280/5.516; 280/5.515; 280/5.512; 267/140.15; 248/550

(58) Field of Classification Search ........... 280/5.516, 280/5.515, 5.519, 5.512; 267/140.15, 140.14, 267/140.5, 140.12, 140.2; 248/550, 635, 248/561

See application file for complete search history.

(56) References Cited

U.S. PATENT DOCUMENTS

| | | | | |
|---|---|---|---|---|
| 4,616,846 A | * | 10/1986 | Furuya et al. ........... 280/5.516 |
| 4,635,906 A | * | 1/1987 | Buma ......................... 267/218 |
| 4,652,010 A | * | 3/1987 | Sugasawa ................ 280/5.511 |
| 4,687,223 A | * | 8/1987 | Miyoshi et al. .......... 280/5.516 |
| 4,776,437 A | * | 10/1988 | Ishibashi et al. ......... 188/266.4 |
| 5,190,269 A | * | 3/1993 | Ikeda et al. ............ 267/140.12 |
| 5,236,182 A | * | 8/1993 | Aoki et al. ............ 267/140.14 |
| 5,413,374 A | * | 5/1995 | Pierce ................. 280/124.177 |
| 5,609,353 A | * | 3/1997 | Watson .................... 280/5.516 |
| 5,816,587 A | * | 10/1998 | Stewart et al. .......... 280/5.516 |
| 5,974,856 A | * | 11/1999 | Elie et al. .................. 73/11.04 |
| 6,446,993 B1 | * | 9/2002 | Huszarik et al. ...... 280/124.177 |
| 7,021,613 B1 | * | 4/2006 | Mikami et al. ............ 267/293 |
| 7,052,002 B1 | * | 5/2006 | Imaeda et al. ......... 267/140.12 |
| 7,063,310 B1 | * | 6/2006 | Power et al. .......... 267/140.12 |
| 2002/0113349 A1 | * | 8/2002 | Rivin ..................... 267/140.2 |
| 2005/0242480 A1 | * | 11/2005 | Nicholson et al. ..... 267/140.12 |

FOREIGN PATENT DOCUMENTS

| JP | 62101936 | 5/1987 |
|---|---|---|
| JP | 2006208 | 1/1990 |

* cited by examiner

*Primary Examiner*—Paul N. Dickson
*Assistant Examiner*—Joselynn Y. Sliteris
(74) *Attorney, Agent, or Firm*—Morgan Lewis & Bockius LLP

(57) ABSTRACT

An active control type mounting bushing device adapted to properly change the hardness of the mounting bushing according to a driving state, thereby obtaining a proper hardness of the mounting bushing for obtaining a comfortable ride during normal driving conditions, and reducing the inclination of the vehicle during the steering, and contributing to an excellent vehicle ride and steering at all times.

5 Claims, 4 Drawing Sheets

ACTIVE CONTROL TYPE MOUNTING BUSHING DEVICE FOR VEHICLE

CROSS-REFERENCE TO RELATED APPLICATIONS

This application claims priority of Korean Application No. 10-2003-0073388, filed on Oct. 21, 2003, the disclosure of which is incorporated fully herein by reference.

FIELD OF THE INVENTION

The present invention provides a mounting bushing device for a vehicle adapted to enable the mounting bushing to form a proper hardness according to the driving state of a vehicle.

BACKGROUND OF THE INVENTION

Generally, a front side member forming the front of the vehicle body is lengthily installed at both sides of the vehicle in the longitudinal direction of the vehicle. The bottom side of the front side member is coupled to a sub-frame to support the engine and transmission.

The sub-frame is coupled via a mounting bushing to the front side member. However, there is a drawback in conventional mounting bushings which provide a constant hardness once the shape and material of the rubber used in the mounting bushing are determined, thereby making it difficult to find an appropriate tuning valve according to various driving conditions of the vehicle.

For example, if the mounting bushing is decreased in hardness to decrease slight vibrations of the vehicle, rolling and bouncing increase. Rolling refers to a vehicle inclining to both lateral sides and bouncing refers to a vehicle moving up and down repeatedly. On the other hand, if the mounting bushing is increased in hardness for eliminating the rolling and bouncing, the amount of impact transmitted from the road surface is increased.

If the mounting bushing is decreased in hardness, the vehicle inclines to one direction, causing deterioration of the steering of the vehicle. If the hardness of the mounting bushing is increased to enable a good steering, the absorption of the road vibration and the steering are respectively deteriorated.

There is a drawback in conventional mounting bushings in that the mounting bushing is limited to a fixed shape and physical characteristics thereof, thereby rendering it difficult to enable both a comfortable vehicle ride and good steering.

SUMMARY OF THE INVENTION

Embodiments of the present invention provide an active control type mounting bushing device for a vehicle adapted to change the hardness of the mounting bushing according to the driving state, thereby maintaining an appropriate hardness of the mounting bushing for an optimal ride under normal driving conditions, and reducing the vehicle inclination during the steering.

In a preferred embodiment of the present invention, the active control type mounting bushing device for a vehicle comprises a mounting bushing which couples a sub-frame to a front side member. A motor forcibly pivots a part of the mounting bushing for changing the shape and hardness of a rubber packed inside the mounting bushing. A steering angle measuring sensor is installed in close proximity to a steering wheel. A controller controls the motor according to the steering angle measured through the steering angle measuring sensor.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
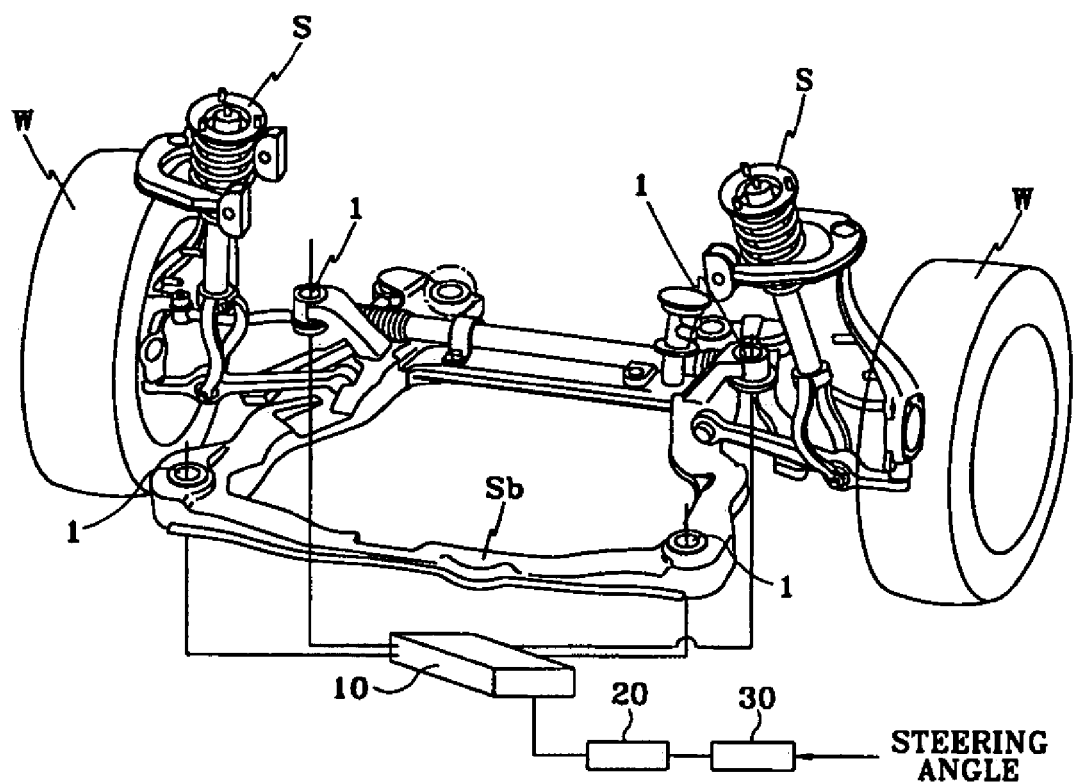
FIG. 1 is a schematic drawing of an active control type mounting bushing according to an embodiment of the present invention.
Figure 2:
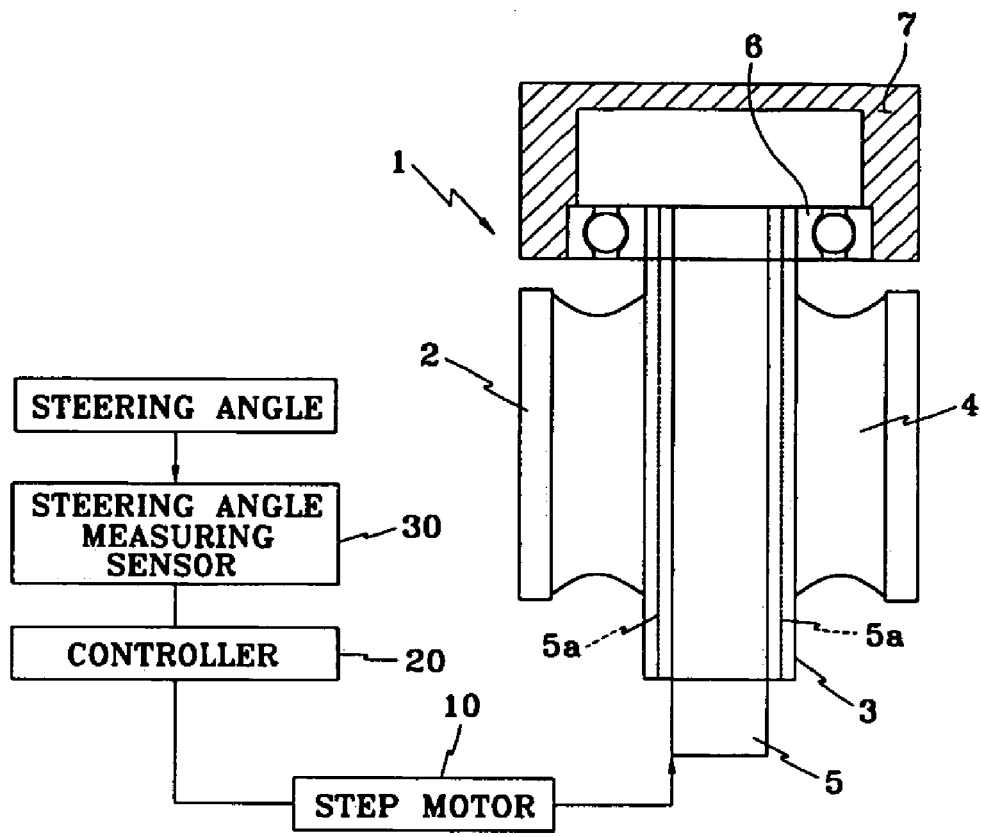
FIG. 2 is a cross-sectional view of a mounting bushing according to an embodiment of the present invention.

As shown in FIGS. 1 and 2, the embodiment of the present invention comprises a mounting bushing 1 which couples a sub-frame (Sb) to a front side member 7. A motor 10 forcibly pivots a part of the mounting bushing 1 for changing the shape and hardness of a rubber 4 packed inside the mounting bushing 1. A steering angle measuring sensor 30 is installed in close proximity to a steering wheel. A controller 20 controls the motor 10 according to the steering angle measured through the steering angle measuring sensor 30. Unexplained symbols S and W respectively refer to a strut and a wheel.

The mounting bushing 1 is composed of a hollow outer pipe 2, which is made of steel and inserted into the sub-frame (Sb). A hollow inner pipe 3 is inserted into the outer pipe 2 and pivotally coupled to the front side member 7 via a bearing 6. The rubber 4 is packed between the outer pipe 2 and the inner pipe 3. A core shaft 5 is inserted inside the inner pipe 3 for pivoting the inner pipe 3, and pivoted by the motor 10.

Figure 3:
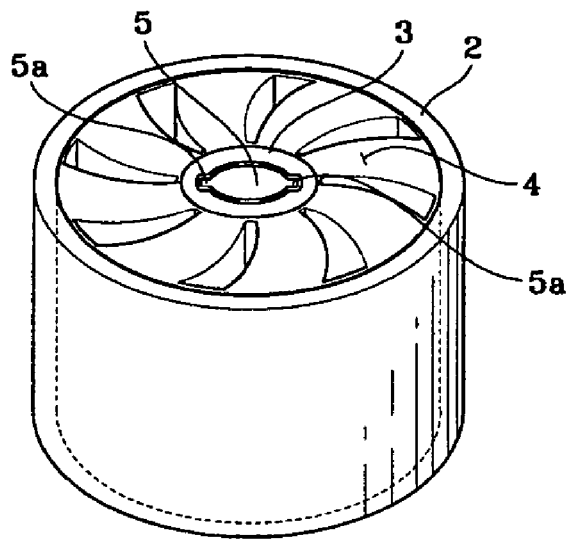
FIG. 3 is a figurative view of a mounting bushing according to an embodiment of the present invention.

The rubber 4, as shown in FIG. 3, is formed in a spiral-shape corresponding to the rotational direction of the motor 10 for changing its shape according to the rotational direction of the inner pipe 3 pivoted by the motor 10.

The mounting bushing 1 is installed at the sub-frame (Sb) where the spiral shape of the rubber is placed in opposite directions of each other at both sides of the vehicle, thereby obtaining a symmetry.

The core shaft 5 is formed with a restricting protruder 5a protruding at both lateral sides of the core shaft 5 for pivoting the inner pipe 3 by the rotation of the motor 10. The core shaft 5 is inserted into a groove formed in the inner pipe 3 in the same shape with the outline of the restricting protruder 5a. The motor 10 pivoting the core shaft 5 is preferably used by a step motor, which accurately restricts its rotation.

The controller 20 is programmed with a data map representing the correlation between vehicle positions varied according to the steering degree of the steering wheel and the hardness of the mounting bushing 1 required for an optimal vehicle ride. The controller 20 controls the rotation of the motor 10 for changing the hardness of the rubber 4 of the mounting bushing 1.

The operation of the embodiment of the present invention will now be described in detail with reference to drawings. The mounting bushing device according to the embodiment of the present invention is initially designed to maintain an excellent vehicle ride by a certain hardness of the rubber 4 during normal driving. Even in a turn or the like, the vehicle maintains an optimal ride at all times by detecting the steering degree of the steering wheel and changing the hardness of the rubber 4 in response to the steering degree.

When a vehicle makes a turn, for example, the steering angle measuring sensor 30 mounted near the steering wheel measures the steering angle of the steering wheel and transmits it to the controller 20. The controller 20 renders the motor 10 to pivot according to a proper restriction signal, wherein the restriction signal is generated from the data map where the correlation between the vehicle position change generated according to the steering degree of the steering wheel and the hardness of the mounting bushing 1 required for the excellent ride is programmed.

Figure 4:
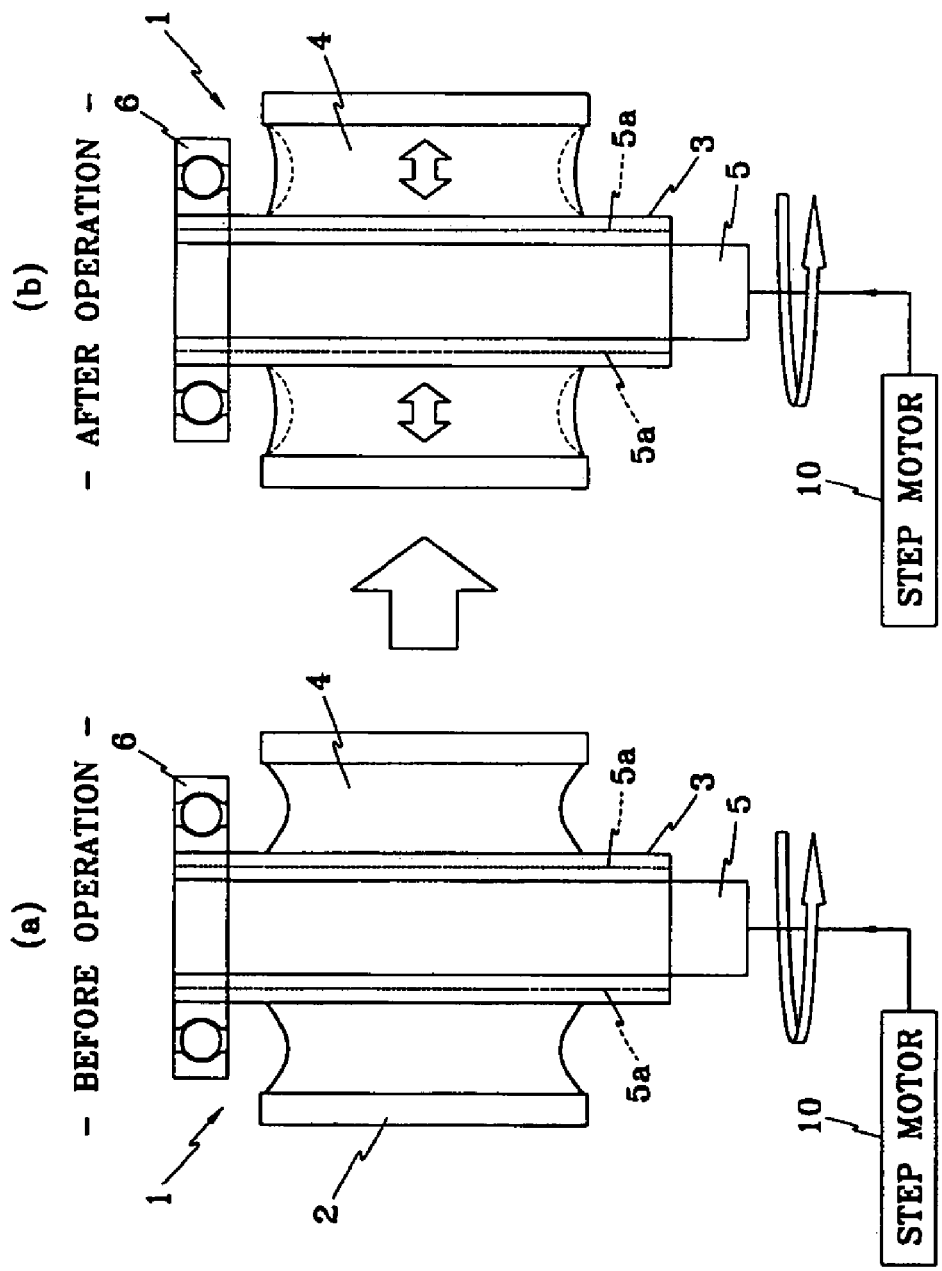
FIGS. 4a and 4b illustrate a comparative operation of an active control type mounting bushing according to an embodiment of the present invention.

When the core shaft 5 pivots via the motor 10, the inner pipe 3 also pivots in the same direction (the rotational direction is the direction which increases the hardness of the rubber 4). As the rubber 4 pivots via the inner pipe 3, the rubber 4 stretches out between the inner pipe 3 and the outer pipe 2 as shown in the states from FIG. 4a to FIG. 4b.

When the rubber 4 is tensioned by stretching and an impact identical to the impact before the rubber 4 stretches is applied, the amount of deformation of the upper and lower portions of the rubber 4 is reduced. In short, stretching the rubber 4 has the same effect as increasing the hardness of the rubber 4, thereby preventing an inclination of the vehicle and improving the steering in comparison to the state before the rubber 4 stretches.

Figure 5:
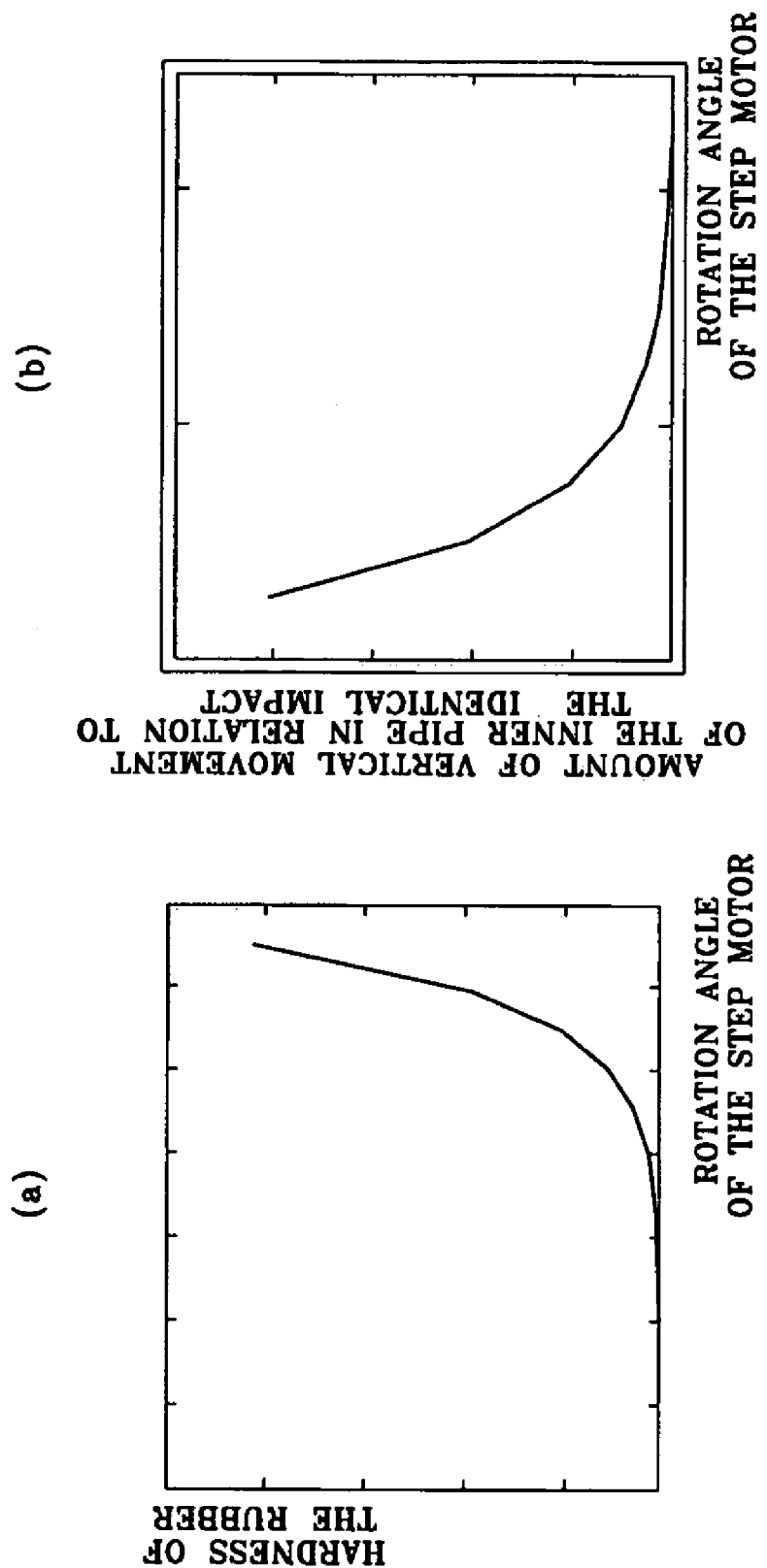
FIGS. 5a and 5b are graphs illustrating a rubber hardness in relation to the rotation angle of a step motor, and an amount of the upper and lower movement of an inner pipe in relation to the rotation angle of a step motor.

As shown in FIG. 5a, the hardness of the rubber 4 of the mounting bushing 1 according to the embodiment of the present invention increases as the rotation angle of the motor 10 increases, and as shown in FIG. 5b, the amount of the deformation of the upper and lower portions of the inner pipe 3 decreases as the rotation angle of the motor 10 increases.

The active control type mounting bushing device according to the embodiment of the present invention satisfies various hardness conditions required during straight driving, turning or the like, thereby maintaining an optimal vehicle ride and steering at all times.

As apparent from the foregoing, there is an advantage in the present invention in that the active control type mounting bushing device is adapted to properly change the hardness of the mounting bushing according to the driving state, thereby obtaining a proper hardness of the mounting bushing to keep an optimal ride during normal driving conditions, and reducing the inclination of the vehicle during the steering, contributing to an obtainment of an excellent vehicle ride and steering at all times.

What is claimed is:

1. An active control type mounting bushing device for a vehicle, comprising:
   a mounting bushing for coupling a sub-frame to a front side member;
   a motor forcibly pivoting a part of said mounting bushing for changing the shape and hardness of a rubber packed inside said mounting bushing;
   a steering angle measuring sensor; and
   a controller controlling said motor according to the steering angle measured through said steering angle measuring sensor.

2. The device of claim 1, wherein said mounting bushing is composed of:
   an outer pipe made of steel and inserted into said sub-frame;
   an inner pipe inserted into said outer pipe and pivotally coupled to said front side member via a bearing;
   a rubber packed between said outer pipe and said inner pipe; and
   a core shaft inserted inside said inner pipe for pivoting said inner pipe and pivoted via said motor.

3. The device of claim 2, wherein said rubber is spiral-shaped.

4. The device of claim 3, wherein said mounting bushing is installed at said sub-frame where the spiral shape of said rubber is placed in opposite directions of each other at both sides of the vehicle.

5. The structure of claim 1, wherein said motor is a step motor.

* * * * *